Patented May 21, 1946

2,400,519

UNITED STATES PATENT OFFICE 2,400,519

VEHICLES FOR STEAM-SET PRINTING INKS

John W. Kroeger, Drexel Hill Plaza, and Daniel J. O'Connor, Jr., Yeadon, Pa., assignors to Fred'k H. Levey Co., Inc., New York, N. Y., a corporation of New York No Drawing. Application July 26, 1944, Serial No. 546,739

4 Claims. (Cl. 106—30)

This invention relates to vehicles for printing inks of the quick-drying type, in particular those inks which are dried quickly by application of steam to the freshly printed web or sheet thereby giving prints which are rub-proof and which will not offset when rewound or stacked.

Vehicles for use in the manufacture of such inks have been made up of a water-insoluble resin dissolved in a water-soluble solvent. Inks consisting of pigments suspended in such vehicles are converted to dry films by the action of steam which causes water to dissolve in the film thereby precipitating the water-insoluble resin. These inks suffer from the very serious difficulty that at high relative humidities, such as may be encountered in summer weather, the inks dry prematurely on inking rollers and printing plates due to precipitation of the resins by the high moisture-content of the surrounding air.

It has been found that inks containing water-soluble resins instead of water insoluble resins will dry quickly upon application of steam even though no precipitation of the resin occurs. Such inks are described in the co-pending application of Kroeger and O'Connor, Serial No. 466,672, filed November 23, 1942.

An object of this invention is the improvement of vehicles for steam-setting inks which are not set on printing rollers and plates even by atmospheres of 100% relative humidity.

A further object of this invention is the preparation of such vehicles from very low-cost materials.

Another object is the development of such vehicles in which the resins are not susceptible to conversion to an insoluble form by the action of certain active pigments.

Another object is the development of such vehicles which are not highly acid and hence do not cause foaming with certain pigments containing carbonates.

Another object of the invention is the preparation of vehicles which will give water-resistant ink films within 24 to 48 hours after printing.

Other objects and advantages of the invention will be apparent as it is better understood by reference to the following specification in which the preferred embodiments are described.

We have discovered that vehicles with the desired properties of water-miscibility, with consequent lack of susceptibility to humidities of even 100%, and low acidity, can be obtained by preparing solutions of certain amine salts of rosins in a liquid polyglycol. These salts have resinous properties in that they are excellent binders for pigments. They are soluble in water hence inks prepared from them are unaffected by high humidities and since their solutions are slightly alkaline, acid-sensitive pigments can be used. In addition, we have found that ink films containing such salts become insoluble in water within 24 to 48 hours after printing. This phenomenon may be due to an irreversible dehydration which has been noted with certain types of emulsifying agents whereby films containing such agents are no longer capable of being redispersed in water after aging for 24 to 48 hours.

In pure form these salts are resinous materials resembling in appearance the resins from which they were made. They can be prepared by (1) reacting the amine with the resin followed by solution in a liquid polyglycol, (2) by addition of the amine to a solution of a resin in a liquid polyglycol or (3) by dissolving the resin in a liquid polyglycol containing the amine. The change in the character of the resin is quite striking. Solutions of many of the resins in diethylene glycol have almost no tolerance for water and on exposure of the surface of the solution to normally humid air an opaque film of precipitated resin immediately flashes across the exposed area. After conversion to an amine salt not only is this behavior eliminated but the solution can be diluted indefinitely with water. Varnishes made with these salts have unusually good wetting properties for many types of pigments due to the strongly polar nature of the binder molecule.

Suitable amines for the preparation of the substituted ammonium salts described above are mono-, di-, and tri-ethanolamines, mono-, di-, and tri-propanolamines, the butanolamines, ethylene diamine, diethylene triamine, triethylene tetramine, propylene diamine, morpholine, morpholino-ethanol, piperazine and hydroxyethyl ethylene diamine. The resins used in the preparation of the salts advantageously have an acid number between 60 and 305.

As mentioned previously inks containing such salts as binders for the pigments have the very desirable property of remaining water-miscible indefinitely in bulk yet when printed the films become water-resistant in 24 to 48 hours. In some cases resistance to water may be attained in as little as 8 to 12 hours or even instantaneously.

Complete salt formation is obtained when exactly one equivalent of amine is used for each equivalent of the resin. However, this invention should not be construed as being limited to these proportions. In many cases good results are obtained when only 0.75 equivalent of amine per equivalent of the resin is used. In other instances it may be desirable to use more than one equivalent of amine per equivalent of the resin as, for example, when poly-amine compounds such as piperazine or ethylene diamine are used.

The following examples will serve to illustrate in more detail the nature of our invention:

Example 1

| | Parts |
|---|---|
| Rosin, acid number: 120.6 | 55.5 |
| Diethylene glycol | 37.3 |
| Triethanolamine | 13.3 |

This proportion of triethanolamine corresponds to 0.75 equivalent per equivalent of rosin.

The three materials were mixed and heated to 140–160° C., until the solution was clear. The product was a moderately tacky varnish with good length and flow and was miscible with water. A 25% solution in distilled water had a pH of 8.2.

Example 2

| | Parts |
|---|---|
| Rosin, acid number: 120.6 | 55.0 |
| Diethylene glycol | 37.3 |
| Triethanolamine (1.0 eq. per eq. of rosin) | 17.8 |

The rosin and diethylene glycol were mixed and heated to 149° C. until the solution was clear. After cooling the triethanolamine was added and the solution was again heated to 93° C. The product was miscible with water and a 25% solution had a pH of 8.4.

Inks are prepared by pigmenting as desired.

Example 3

| | Parts |
|---|---|
| Rosin, acid number: 120.6 | 55.50 |
| Diethylene glycol | 37.30 |
| Morpholine (1.0 eq. per eq. of rosin) | 10.35 |

The procedure described in Example 2 was used.

The product was miscible with water and a 25% solution had a pH of 9.18.

Example 4

| | Parts |
|---|---|
| Rosin, acid number: 120.6 | 55.5 |
| Diethylene glycol | 37.3 |
| Morpholine (0.75 eq. per eq. of rosin) | 7.8 |

The procedure described in Example 2 was used.

The product was miscible with water and a 25% solution had a pH of 9.11.

Example 5

| | Parts |
|---|---|
| Rosin, acid number: 120.6 | 55.5 |
| Diethylene glycol | 37.3 |
| 2-ethyl-2-amino-1,3-propandiol (1.0 eq. per eq. of rosin) | 14.2 |

The procedure described in Example 2 was followed. The product was miscible with water and a 25% solution had a pH of 9.26.

Example 6

| | Parts |
|---|---|
| Rosin, acid number: 145 | 50.0 |
| Diethylene glycol | 50.0 |
| Triethanolamine (0.51 eq. per eq. of rosin) | 10.0 |
| Dispersing agent (non-ionic, high molecular weight, poly-ether-alcohol) | 5.0 |

The procedure described in Example 1 was used.

The product was miscible with water.

Other examples are tabulated below:

Table I

In each of the examples below 56.0 parts of rosin (acid number: 120.6) and 38.0 parts of diethylene glycol were used.

| Example | Amine | Eq. per eq. rosin | Parts amine | pH 5% sol. |
|---|---|---|---|---|
| 7 | Ethylene diamine | 2.6 (1.3 moles) | 9.3 | 9.41 |
| 8 | Piperazine hexahydrate | 2.0 (1.0 mole) | 23.2 | 7.72 |

Table II

In each of the examples below 50.0 parts of rosin (acid number: 145) and 40 parts of diethylene glycol were used.

| Example | Amine | Eq. per eq. rosin | Parts amine | pH 5% sol. |
|---|---|---|---|---|
| 9 | Triethanolamine | 0.8 | 15.5 | 8.96 |
| 10 | Tetraethylene-pentamine | [1] 8.0 | 39.2 | 9.87 |
| 11 | Monoethanolamine | 1.0 | 7.9 | 8.50 |

[1] 1.6 moles.

The polyamine salts give opaque solutions upon extensive dilution with water. All the varnishes in the tables above were miscible with water.

Table III

In each of the examples below 40.0 parts of dewaxed shellac (acid number: 65.4) and 60.0 parts of diethylene glycol were used.

| Example | Amine | Eq. per eq. shellac | Parts amine | pH 5% solution |
|---|---|---|---|---|
| 12 | Monoethanolamine | 1.0 | 2.85 | 8.29 |
| 13 | Triethanolamine | 1.0 | 6.95 | 7.49 |
| 14 | Triethanolamine | 0.8 | 5.56 | 7.01 |
| 15 | Piperazine hexahydrate | 2.2 | 9.98 | 9.10 |
| 16 | 2-amino-2-ethyl-1,3-propandiol | 1.0 | 5.55 | 7.78 |
| 17 | Ethylene diamine | 3.6 | 5.00 | 9.62 |

The varnish of Example 17 gave a cloudy dispersion when diluted with water.

Examples involving other resins are listed in Table IV. The resin of Example 20 was prepared from rosin and fumaric acid by the diene synthesis and had a softening point of 229° F. The resin of Example 21 was prepared from 92 parts of glycerol, 116 parts of fumaric acid and 160 parts of rosin by heating at 200° C. for 45 minutes. The resin of Example 22 was prepared from 92 parts of glycerol, 166 parts of phthalic acid and 160 parts of rosin by heating at 200° C. for 1.75 hours.

Table IV

| Example | Resin | Acid No. of resin | Parts resin | Parts diethylene glycol | Parts triethanolamine | pH 5% solution |
|---|---|---|---|---|---|---|
| 18 | Gum mastic | 62.2 | 50 | 50 | 16.6 (2.0 eq.) | 9.1 |
| 19 | Manila, Loba C | 166.0 | 15.8 | 23.7 | 7.0 (1.0 eq.) | 8.7 |
| 20 | Rosin-fumaric adduct | 302.0 | 50 | 50 | 32.2 (0.8 eq.) | 7.05 |
| 21 | Glycerol-fumarate, rosin-modified | 117.8 | 50 | 50 | 15.6 (1.0 eq) | 7.2 |
| 22 | Glycerol-phthalate, rosin-modified | 118 | 50 | 50 | 15.7 (1.0 eq.) | 8.1 |

On dilution with water varnishes of Examples 18 and 21 gave milky, soapy solutions while those of Examples 19, 20 and 22 gave slightly cloudy, soapy solutions.

The behavior of these salts in inks is illustrated by the following:

An ink was made using the varnish of Example 1, 65 parts, carbon black, 15 parts, and diethylene glycol, 20 parts. The ink had good length and flow and films on paper dried in approximately one second when exposed to steam. The pigment was very well bound in the dried films and water-resistance was excellent immediately after drying. This speed of attainment of water-resistance in the film varies with the formula of the ink and the type of stock upon which it is printed. In some cases immediate attainment of water-resistance was noted. In others 8 to 48 hours were required before the films became water-resistant.

It will be understood that inks may be prepared from the vehicles described by mixing with various pigments both black and colored according to well known methods of ink formulation.

The term "acid number" in the claims is the number of milligrams of potassium hydroxide equivalent to 1.0 gram of substance.

Various changes may be made in the details of the ink formulations without departing from the invention or sacrificing the advantages thereof.

We claim:

1. A vehicle for use in making printing inks consisting essentially of a nonaqueous solution in a liquid polyglycol of a water-miscible salt formed by reacting substantially equimolar proportions of an amine and a resin having an acid number between 60 and 305.

2. A vehicle for use in making printing inks consisting essentially of a nonaqueous solution in a liquid polyglycol of a water-miscible salt formed by reacting substantially equimolar proportions of triethanolamine and a resin having an acid number between 60 and 305.

3. A vehicle for use in making printing inks consisting essentially of a nonaqueous solution in a liquid polyglycol of a water-miscible salt formed by reacting substantially equimolar proportions of ethylene diamine and a resin having an acid number between 60 and 305.

4. A vehicle for use in making printing inks consisting essentially of a nonaqueous solution in a liquid polyglycol of a water-miscible salt formed by reacting substantially equimolar proportions of morpholine and a resin having an acid number between 60 and 305.

JOHN W. KROEGER.
DANIEL J. O'CONNOR, JR.